US009181916B2

(12) United States Patent
Wijaya et al.

(10) Patent No.: US 9,181,916 B2
(45) Date of Patent: Nov. 10, 2015

(54) ENGINE START-STOP CONTROL STRATEGY FOR OPTIMIZATION OF CABIN COMFORT AND FUEL ECONOMY

(75) Inventors: Halim Wijaya, Sterling Heights, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 13/561,328

(22) Filed: Jul. 30, 2012

(65) Prior Publication Data

US 2014/0032086 A1    Jan. 30, 2014

(51) Int. Cl.
*F02N 11/08* (2006.01)
*F02D 41/04* (2006.01)

(52) U.S. Cl.
CPC ............ *F02N 11/0837* (2013.01); *F02N 11/08* (2013.01); *F02N 11/084* (2013.01); *F02N 11/0814* (2013.01); *F02N 11/0848* (2013.01); *F02D 41/042* (2013.01); *F02N 2200/023* (2013.01); *F02N 2200/0804* (2013.01); *F02N 2200/0811* (2013.01); *F02N 2200/0813* (2013.01); *F02N 2200/0815* (2013.01); *F02N 2200/122* (2013.01); *Y02T 10/48* (2013.01)

(58) Field of Classification Search
CPC . F02N 11/08; F02N 11/0814; F02N 11/0837; F02D 41/042
USPC ............ 123/179.3, 179.4, 198 DB, 325, 332; 62/244
See application file for complete search history.

(56) References Cited

U.S. PATENT DOCUMENTS

| | | | |
|---|---|---|---|
| 4,938,033 A * | 7/1990 | Ogihara et al. | 62/186 |
| 5,117,643 A * | 6/1992 | Sakurai et al. | 62/133 |
| 6,672,085 B1 * | 1/2004 | Sangwan et al. | 62/133 |
| 7,007,856 B2 | 3/2006 | La Falce et al. | |
| 7,032,393 B2 | 4/2006 | Tamai et al. | |
| 7,275,379 B2 | 10/2007 | Zeng et al. | |
| 8,151,581 B2 * | 4/2012 | Chen et al. | 62/157 |
| 2004/0144107 A1 | 7/2004 | Breton et al. | |
| 2005/0193747 A1 * | 9/2005 | Kajimoto et al. | 62/133 |
| 2006/0123824 A1 * | 6/2006 | Casar et al. | 62/244 |

(Continued)

OTHER PUBLICATIONS

Ormerod et al., Development of a Control System for a Mild Hybrid Vehicle, 2001, 7 pages, Ricardo Consulting Engineers Limited.

(Continued)

*Primary Examiner* — Mahmoud Gimie
(74) *Attorney, Agent, or Firm* — LeClairRyan

(57) ABSTRACT

A Start-Stop method and system for optimizing a selected set of parameters to provide an ideal balance between cabin thermal comfort and fuel economy performance is disclosed. The method and system include several parameters to manage how long and when the engine OFF time will occur. Such parameters include, but are not limited to, outside ambient temperature, cabin temperature, cabin humidity, engine coolant temperature, and evaporator thermistor temperature. A control logic monitors inputs such as cabin humidity and, under certain conditions, sends a request for the engine to be ON. Other factors influencing engine ON time include inputs from the wiper(s), the heated windshield, the heated back light, the HVAC blower, and the temperature control setting. The disclosed system has utility in both electronic automatic temperature control (EATC) systems as well as in manual temperature control (MTC) systems.

19 Claims, 6 Drawing Sheets

(56) References Cited

U.S. PATENT DOCUMENTS

| | | | |
|---|---|---|---|
| 2008/0125935 A1* | 5/2008 | Chen et al. | 701/36 |
| 2008/0183334 A1* | 7/2008 | Greiner et al. | 700/276 |
| 2009/0018707 A1 | 1/2009 | Oakes | |
| 2009/0198438 A1* | 8/2009 | Jinno | 701/110 |
| 2009/0314847 A1* | 12/2009 | Nemoto et al. | 237/5 |
| 2010/0100306 A1* | 4/2010 | Gamache et al. | 701/113 |

OTHER PUBLICATIONS

Guyonvarch et al., Cold Storage and Thermal Comfort in Stop-Start Vehicles and Urban Driving Cycles, Jan. 2005, Revue De L'Electricite Et De L'Electronique Volume No. 1, Issue 1, pp. 80-84.

\* cited by examiner

ENGINE START-STOP CONTROL STRATEGY FOR OPTIMIZATION OF CABIN COMFORT AND FUEL ECONOMY

TECHNICAL FIELD

The disclosed invention relates generally to a strategy for controlling engine on and off time in a vehicle. More particularly, the disclosed invention relates to a strategy for controlling engine on and off time to optimize cabin comfort and fuel economy. Engine off time is based on variables including cabin temperature, contemporary ambient weather conditions and engine coolant temperature. Engine on time is based on variables including HVAC status, temperature control setting and various heating and cooling outputs.

BACKGROUND OF THE INVENTION

Increased motor vehicle fuel efficiency is a long-standing objective of automobile designers and producers. Various approaches to increasing fuel efficiency have been taken including improving vehicle aerodynamics, reducing vehicle weight and improving vehicle operating efficiency. This latter approach includes devoting greater attention to drive train engineering. It also includes focusing on the vast array of peripheral devices provided with the modern automobile to improve driver and passenger comfort and looking for ways to increase efficiency in the design, use and operation of such peripheral devices.

In the conventional motor vehicle, the climate control heating and cooling systems depend on the engine being on for a certain amount of time (ON time) in order to provide thermal comfort in the vehicle cabin. When not needed, the vehicle's engine is turned off. According to known technology, the vehicle ON and OFF times are not managed and are subject only to the random choices of the vehicle operator without consideration of fuel economy.

Accordingly, if the engine OFF time is not managed properly, the balance between optimized cabin thermal comfort and fuel economy will not be achieved. As is often the case, there is room for improvement in the art of controlling vehicle operation and control to achieve maximum passenger cabin comfort for the vehicle occupants while at the same time optimizing vehicle fuel economy.

SUMMARY OF THE INVENTION

The disclosed invention provides a Start-Stop strategy for optimizing a selected set of parameters to provide an ideal balance between cabin thermal comfort and fuel economy performance. Particularly, the disclosed Start-Stop strategy includes several defined parameters to manage how long and when the engine OFF time will occur. These parameters include, but are not limited to, outside ambient temperature (Tambient), cabin temperature (Tincar), cabin humidity, engine coolant temperature (ECT), and evaporator thermistor temperature (Tevap).

More particularly, the disclosed system has utility in both electronic automatic temperature control (EATC) systems as well as in manual temperature control (MTC) systems. When used in conjunction with an EATC system, variables include Tambient, Tset point (that is, the temperature door position), engine coolant temperature (ECT), Tcabin, cabin humidity (typically as a percentage), evaporative thermistor temperature, and sunload. Similarly (but not the same), when used in conjunction with an MTC system, variables include Tambient, Tset point (that is, the temperature door position), engine coolant temperature (ECT), Tcabin, cabin humidity (typically as a percentage), and evaporative thermistor temperature.

Whether an EATC system or an MTC system other inputs include, for example, the demands of the wiper(s), the heated windshield, the heated back light, the HVAC blower, the temperature control setting. Other variables are possible.

The disclosed Start-Stop strategy generally includes the following steps. First, the selected cabin thermal comfort needs to be achieved before the engine can be turned OFF. The cabin thermal comfort can be based upon either the slope of Tincar/time or on Tincar at the given cabin thermal load.

In the event that the cabin thermal comfort is based upon the slope of Tincar/time, if the slope of Tincar/time is flat then the cabin thermal comfort has reached a steady state condition.

If, instead, the cabin thermal comfort is based on Tincar at the given cabin thermal load, then the cabin thermal load can be determined from an established look-up table.

The control logic also ensures that Tevap does not exceed a certain value since odor may occur in the event of a hot ambient temperature. In addition, if the control logic determines that the Tevap reaches a certain temperature then engine ON request will be sent. Next, the control logic monitors cabin humidity for any fogging probability risk. If the fogging probability is very high, the control logic will also send an engine ON request.

Other factors for the engine ON request include the status of the wiper, the heated back light, and the heated windshield. In addition, any detected change in additional variables (such as, but not limited to, the HVAC blower, the temperature control setting, and the A/C setting) will initiate the sending of an engine ON request.

The disclosed Start-Stop strategy provides an effective and efficient method of optimizing cabin thermal comfort and fuel economy performance depending on certain variables.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawing and described below by way of examples of the invention wherein.

DETAILED DESCRIPTION OF THE PREFERRED EMBODIMENT

Figure 1:
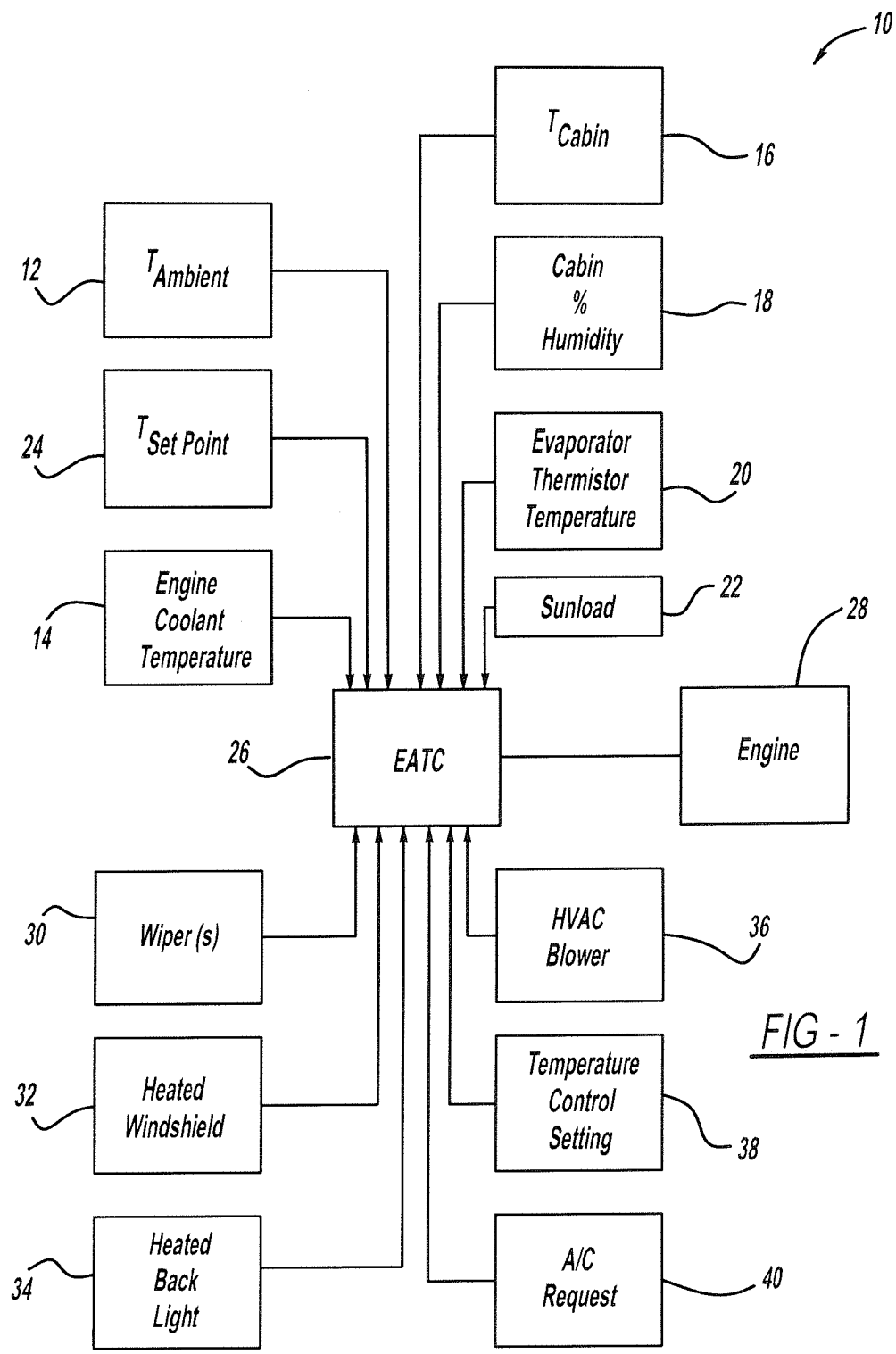
FIG. 1 is a is a block diagram illustrating a Start-Stop strategy for an electronic automatic temperature control system.

In the following figures, the same reference numerals will be used to refer to the same components. In the following description, various operating parameters and components are described for different constructed embodiments. These specific parameters and components are included as examples and are not meant to be limiting.

In general, the system and method for providing vehicle OFF and ON times is discussed in detail hereinafter. The disclosed Start-Stop control strategy enables the achievement of a good balance between thermal comfort control within the vehicle and maximum fuel economy. According to the disclosed system and method, users will achieve an optimum cabin thermal comfort without compromising fuel economy. Control management may be by way of either electronic automatic temperature control (EATC) or manual temperature control (MTC). Regardless of whether the control arrangement is by way of automatic temperature control or manual temperature control the system and method of the disclosed Start-Stop strategy uses a control logic which responds to various input parameters and responds with engine OFF or ON instructions.

The selected cabin thermal comfort needs to be achieved before the engine can be turned OFF. The cabin thermal comfort can be based upon either on the slope of Tincar/time or on Tincar at the given cabin thermal load. In the event that the cabin thermal comfort is based upon the slope of Tincar/time, if the slope of Tincar/time is flat then it means that the cabin thermal comfort has reached a steady state condition. If instead the cabin thermal comfort is based on Tincar at the given cabin thermal load, then the cabin thermal load can be determined from an established look-up table.

Figure 2A:
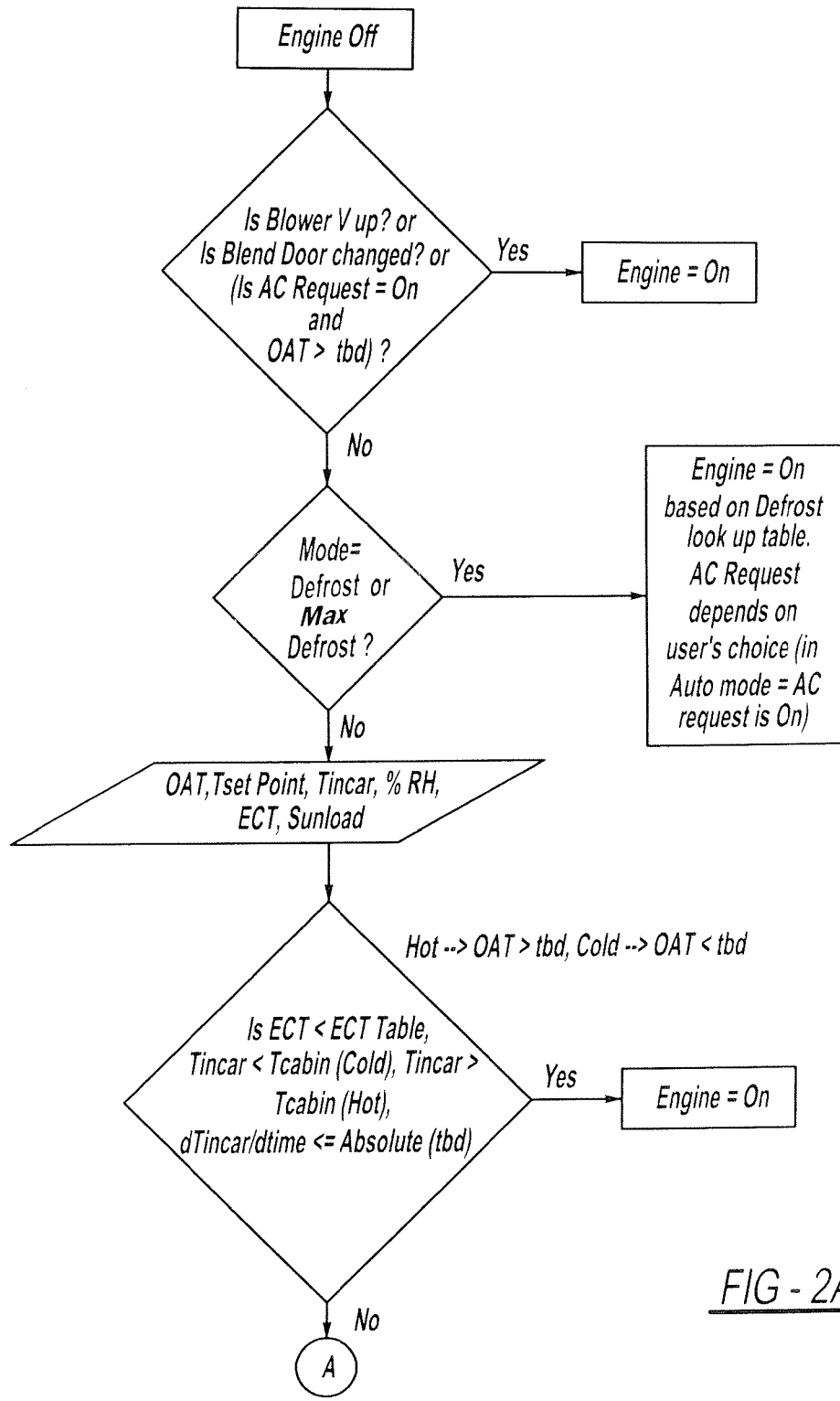
FIGS. 2A and 2B represent a flow chart illustrating a Start-Stop strategy for an electronic automatic temperature control system.
Figure 2B:
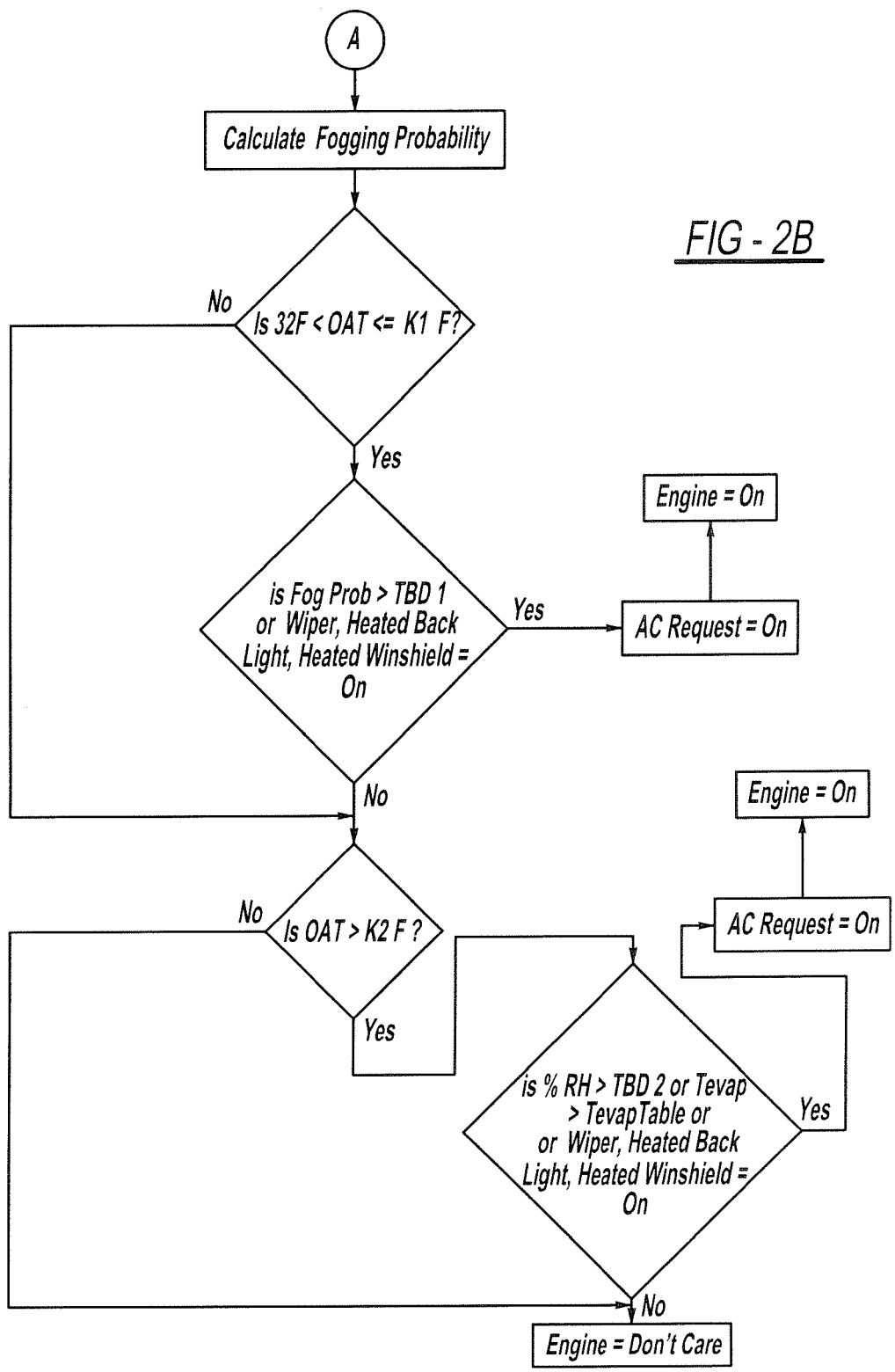
Figure 3:
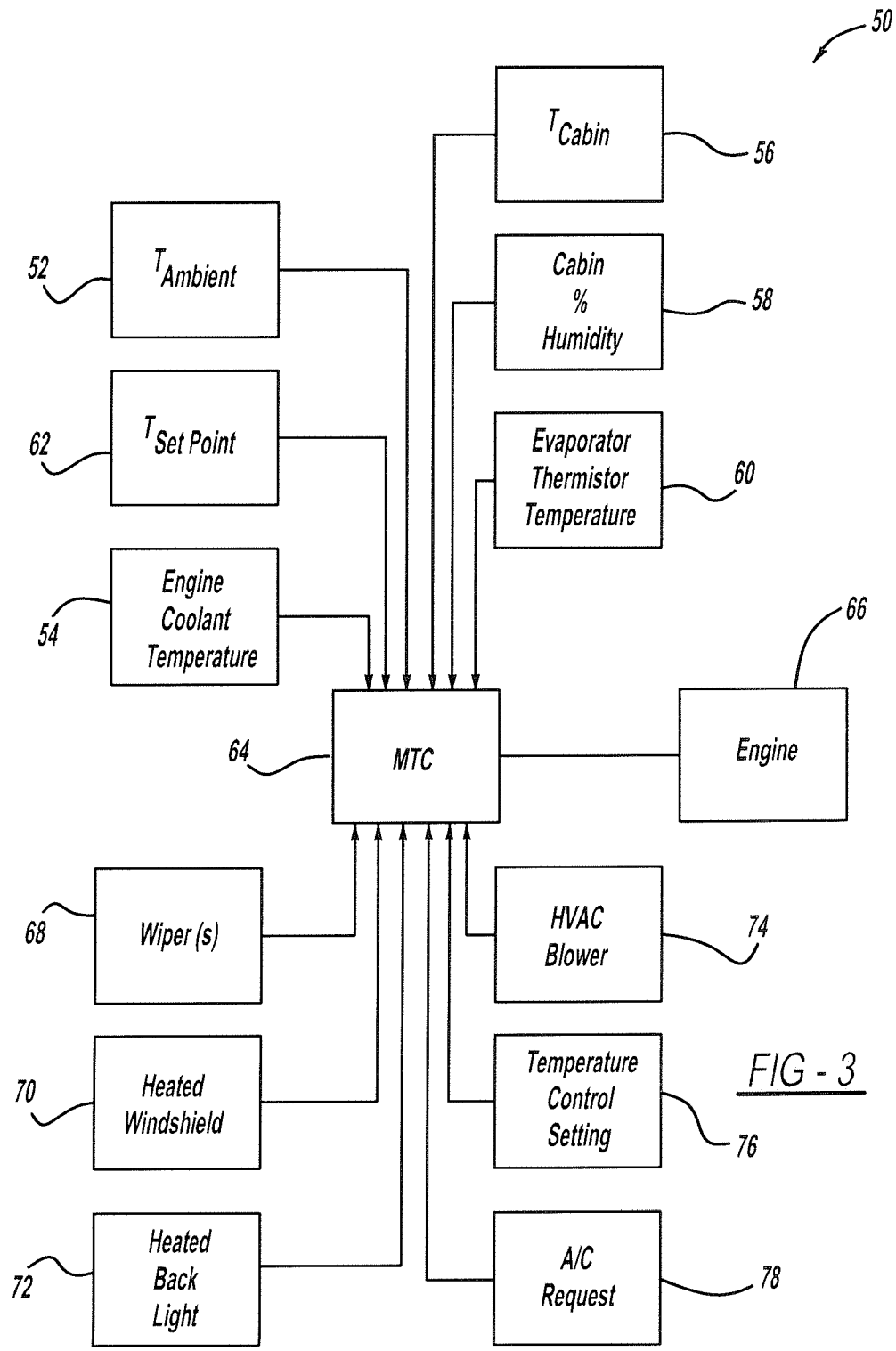
FIG. 3 is a block diagram illustrating a Start-Stop strategy for a manual control head temperature control system.
Figure 4A:
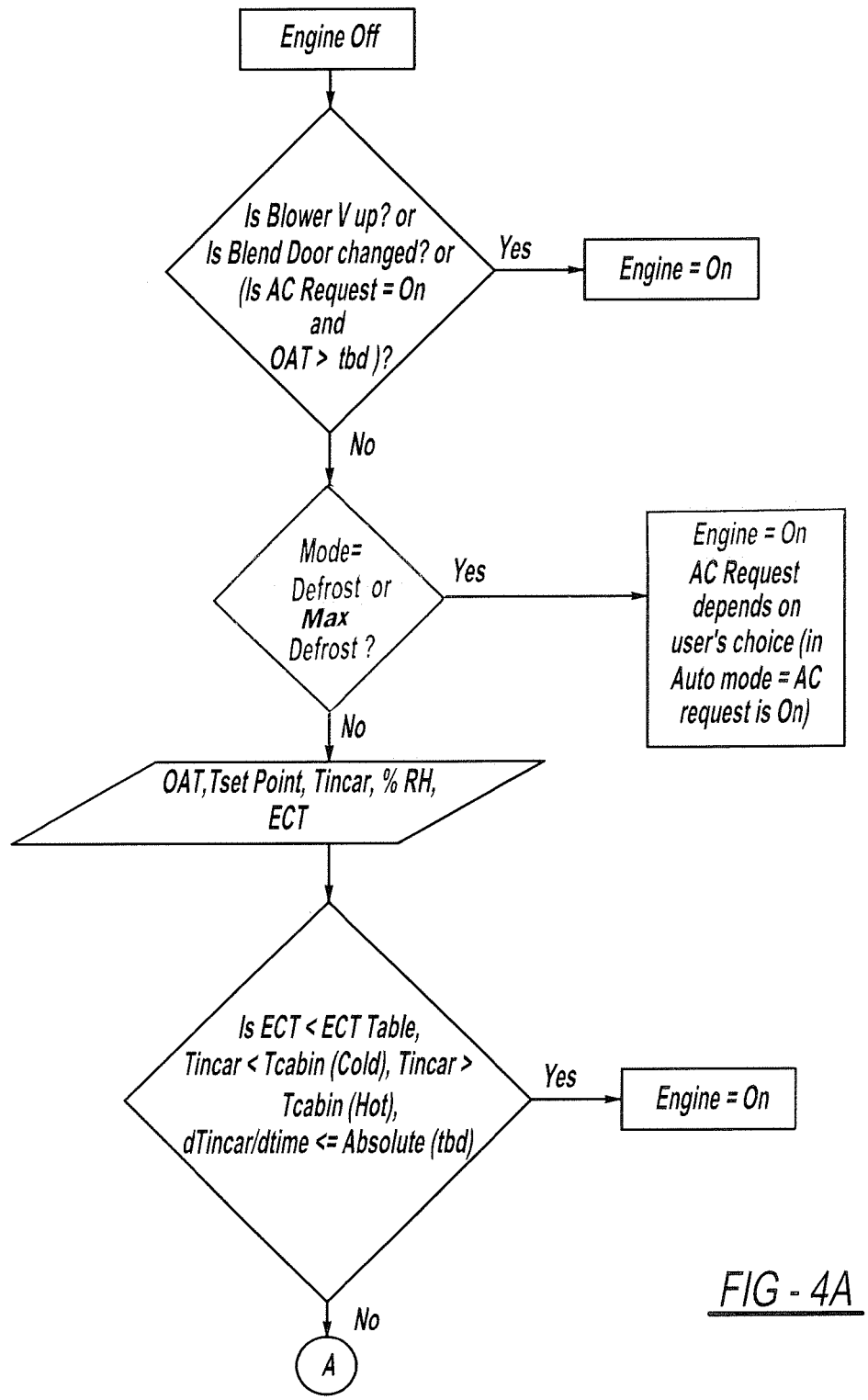
FIGS. 4A and 4B represent a flow chart illustrating a Start-Stop strategy for a manual control head temperature control system according to a first embodiment of the disclosed invention.
Figure 4B:
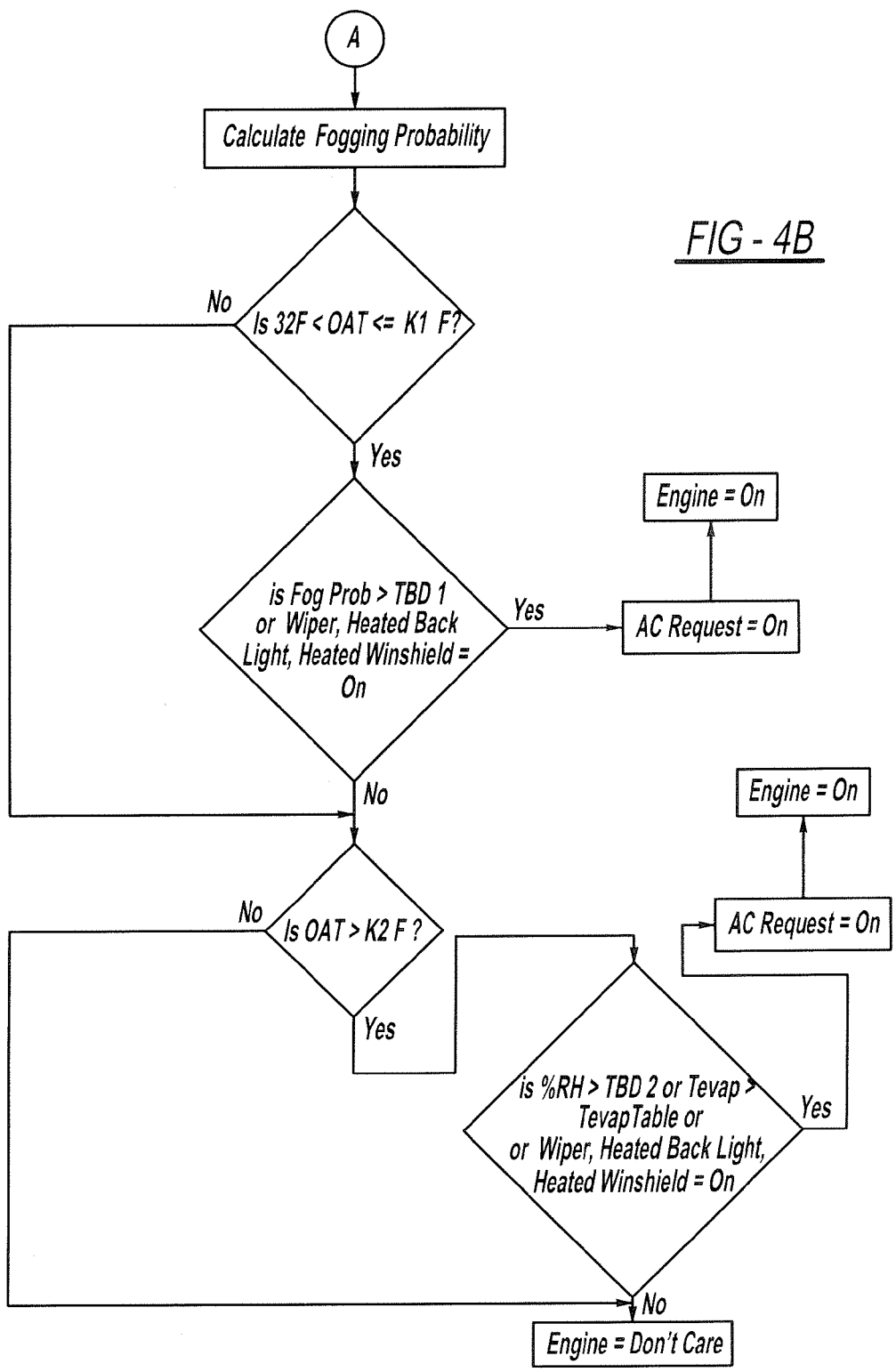

FIGS. 1, 2A and 2B relate to a method and system for a Start-Stop strategy using an electronic automatic temperature control system. FIGS. 3, 4A and 4B relate to a method and system for a Start-Stop strategy for use with a manual control head temperature system.

Referring first to the Start-Stop strategy using an electronic automatic temperature control system of the disclosed invention and with reference to FIG. 1, a block diagram illustrating a representative Start-Stop strategy for an electronic automatic temperature control (EATC) system is shown, generally illustrated as 10. The system 10 includes various sensors that provide signals representative of ambient (outside) air temperature (Tambient) 12, engine coolant temperature (ECT) 14, the vehicle cabin temperature (Tcabin) 16, the vehicle cabin humidity (as a percentage) 18, the evaporator thermistor temperature 20, and the sunload 22. In addition, an occupant interface allows the occupant to provide a desired temperature or temperature range (Tset Point) 24. The sensor and interface signals are provided to the electronic automatic temperature control (EATC) 26 which is operatively associated with the engine 28.

The inputs provided to the EATC 26 from the ambient air temperature 12, the engine coolant temperature 14, the cabin temperature 16, the vehicle cabin humidity 18, the evaporator thermistor temperature 20, the sunload 22, and the temperature or temperature range 24 in general enable the EATC 26 to establish engine ON and OFF times as required for desired cabin thermal comfort and maximum fuel economy. However, other inputs may provide information to the control logic of the EATC 26. These include, without limitation, the windshield wiper(s) 30, the heated windshield 32, the heated back light 34, the HVAC blower 36, the temperature control setting 38, and the A/C request 40.

With respect to FIGS. 2A and 2B, a flow chart illustrating a Start-Stop strategy for an electronic automatic temperature control system according to an embodiment of the disclosed invention is set forth. According to the illustrated flow chart, the engine is first confirmed to be in its OFF condition. An initial inquiry is made as to system status. Specifically, one or more of the following queries may be made: Is the blower voltage ("Blower V") up? OR has the blend door position been changed ("Blend Door [position] changed")? OR is the air conditioning turned on ("AC Request=ON) coupled with the outside ambient temperature ("OAT") being greater than a predetermined value? If any one of these events has occurred then the vehicle engine is turned to its ON condition.

If, on the other hand, none of these events has occurred an inquiry is made as to whether or not the HVAC system is in the defrost mode. If the system is in the defrost mode, then reference is made to a look up table the engine will be turned to its ON condition. In addition, an engine ON request may also be initiated depending on the status of the AC which is dependent upon the choice of the user or, if the system is in the "auto" mode, then the request is ON.

If the system is not in the defrost mode, then one or more of the ambient air temperature 12, the engine coolant temperature 14, the cabin temperature 16, the vehicle cabin humidity 18, the evaporator thermistor temperature 20, the sunload 22, and the temperature or temperature range 24 will be evaluated to determine engine pull up or pull down ("EPUD"). The EPUD may be based on the Tcabin according to the outside ambient temperature versus the Tset point (whether there is low/no sunload or whether there is high sunload). As an alternative, the EPUD may be based on the slope of Tincar/time according to the outside ambient temperature versus the Tset point for high sunload. As a further alternative, the EPUD may be based on engine coolant temperature according to the outside ambient temperature versus the Tset point. As yet a further alternative, the EPUD may be based on the evaporator thermistor temperature according to the outside ambient temperature versus the Tincar.

Once the EPUD is determined based upon one or more of the inquiries set forth above, the following query is made: Is the engine coolant temperature less than a temperature specified in a look-up table? Is the Tincar less than the Tcabin (based on the look up table in the heating mode) or is the Tincar greater than the Tcabin (based on the look up table in the cooling mode)? Is the Tincar/time slope less than an absolute temperature (to be determined)? If the determination of any of these is found to be "yes," then an engine ON request is made.

If no "yes" determination is made, then the engine remains OFF and an assessment of fogging probability is made. If the risk of fogging probability is determined to be very high, then the control logic of the EATC 26 will send an engine ON request. On the other hand, if the risk of fogging probability is determined not to be very high, then the following inquiry is made: Is K1 (a calibratable value) greater than the ambient temperature and is the ambient temperature greater than the freezing point? If this inquiry is answered "yes," then a further determination is made. Specifically, if fogging probability ("Fog Prob") is determined to be greater than a certain predetermined value or if the wiper(s) 30, heated windshield 32, or heated back light 34 are "on" coupled with the AC request being "on" (depending on the user's choice or the auto mode being set to "on" as described above), then an engine ON request is made.

On the other hand, if the answer is "no" to the inquiry "Is K1 greater than the ambient temperature and is the ambient temperature greater than the freezing point?", then an additional inquiry is made: Is K2 (a calibratable value) less than the outside ambient temperature? If the answer to this inquiry is "yes," then a further determination is made. Specifically, if the percentage of relative humidity ("% RH") is found to be greater than a determined level or if the temperature of evaporation ("Tevap") is found to be greater than an evaporator thermistor temperature table ("Tevap Table") or if the wiper(s) 30, the heated windshield 32, or the heated back light 34 are "on" coupled with the AC request being "on" (again depending on the user's choice or the auto mode being set to "on" as described above), then an engine ON request is made.

If the answer is "no" to the inquiry "Is K2 (a calibratable value) less than the outside ambient temperature?", then the control logic finishes its inquiries and no further requests for either engine ON or engine Off are made.

The discussion above regarding FIGS. 1, 2A and 2B relates to a method and system for a Start-Stop strategy using an electronic automatic temperature control system. As an alternative to this approach, the method and system for a Start-Stop strategy according to the disclosed invention may also employ a manual control head system as set forth in FIGS. 3, 4A and 4B.

Referring Start-Stop strategy using a manual control head system of the disclosed invention, and with reference to FIG. 3, a block diagram illustrating a representative Start-Stop strategy for a manual temperature control system (MTC) is shown, generally illustrated as 50. The system 50 includes various sensors that provide signals representative of ambient (outside) air temperature (Tambient) 52, engine coolant temperature (ECT) 54, the vehicle cabin temperature (Tcabin) 56, the vehicle cabin humidity (as a percentage) 58, and the evaporator thermistor temperature 60. (No sunload sensor is provided with the manual temperature control system.) In addition, an occupant interface allows the occupant to provide a desired temperature or temperature range (Tset Point) 62. The sensor and interface signals are provided to the manual temperature control (MTC) 64 which is operatively associated with the engine 66.

The inputs provided to the MTC 64 by the ambient air temperature 52, the engine coolant temperature 54, the cabin temperature 56, the vehicle cabin humidity 58, the evaporator thermistor temperature 60, and the temperature or temperature range (Tset Point) 62 in general enable the MTC 64 to establish engine ON and OFF times as required for desired cabin thermal comfort and maximum fuel economy. However, as with the EATC system set forth above, other inputs may provide information to the control logic of the MTC 64. These include, without limitation, the windshield wiper(s) 68, the heated windshield 70, the heated back light 72, the HVAC blower 74, the temperature control setting 76, and the A/C request 78.

With respect to FIGS. 4A and 4B, a flow chart illustrating a Start-Stop strategy for a manual temperature control system according to an embodiment of the disclosed invention is set forth. According to the illustrated flow chart, the engine is first confirmed to be in its OFF condition. An initial inquiry is made as to system status. Specifically, one or more of the following queries may be made: Is the blower voltage ("Blower V") up? OR has the blend door position been changed ("Blend Door [position] changed")? OR is the air conditioning turned on ("AC Request=ON) coupled with the outside ambient temperature ("OAT") being greater than a predetermined value? If any one of these events has occurred, then the vehicle engine is turned to its ON condition.

If, on the other hand, none of these events has occurred, an inquiry is made as to whether or not the HVAC system is in the defrost mode. If the system is in the defrost mode, then reference is made to a look up table the engine will be turned to its ON condition. In addition, an engine ON request may also be initiated depending on the status of the AC which is dependent upon the choice of the user or, if the system is in the "auto" mode, then the request is ON.

If the system is not in the defrost or max defrost mode, then one or more of the ambient air temperature 52, the engine coolant temperature 54, the cabin temperature 56, the vehicle cabin humidity 58, the evaporator thermistor temperature 60, and the temperature or temperature range (Tset Point) 62 will be evaluated to determine engine pull up or pull down ("EPUD"). The EPUD may be based on the Tcabin according to the outside ambient temperature versus the temperature door position being between, for example, 0% closed (full cold) and 100% open (full hot). As an alternative, the EPUD may be based on engine coolant temperature according to the outside ambient temperature versus the temperature door position being between, for example, 0% and 100% of full heat. As a further alternative, the EPUD may be based on the slope of Tincar/time according to the outside ambient temperature versus the temperature door position being between, for example, 0% and 100% of full heat. As yet a further alternative, the EPUD may be based on the evaporator thermistor temperature according to the outside ambient temperature versus the Tincar.

Once the EPUD is determined based upon one or more of the inquiries set forth above, the following query is made: Is the engine coolant temperature less than a temperature specified in a look-up table? Is the Tincar less than the Tcabin (in heating mode) or is the Tincar greater than the Tcabin (in cooling mode)? Is the Tincar/time slope less than an absolute temperature (to be determined)? If the determination of any of these is found to be "yes," then an engine ON request is made.

If no "yes" determination is made, then the engine remains OFF and an assessment of fogging probability is made. The following inquiry is made: Is K1 (a calibratable value) greater than the ambient temperature and is the ambient temperature greater than the freezing point? If this inquiry is answered "yes," then a further determination is made. Specifically, if fogging probability ("Fog Prob") is determined to be greater than a certain predetermined value or if the wiper(s) 68, heated windshield 70, or heated back light 72 are "on" coupled with the AC request being "on" (based on the user's choice or the auto mode being set to "on" as described above), then an engine ON request is made.

On the other hand, if the answer is "no" to the inquiry "Is K1 (a calibratable value) greater than the ambient temperature and is the ambient temperature greater than the freezing point?", then an additional inquiry is made: Is K2 (another calibratable value) less than the outside ambient temperature? If the answer to this inquiry is "yes," then a further determination is made. Specifically, if the percentage of relative humidity ("% RH") is found to be greater than a determined level or if the temperature of evaporation ("Tevap") is found to be greater than an evaporator thermistor temperature table ("Tevap Table") or if the wiper(s) 68, the heated windshield 70, or the heated back light 72 are "on" coupled with the AC request being "on" (again depending on the user's choice or the auto mode being set to "on" as described above), then an engine ON request is made.

If the answer is "no" to the inquiry "Is K2 (another calibratable value) less than the outside ambient temperature?", then the control logic finishes its inquiries and no further requests for either engine ON or engine Off are made.

The above-described logic is only exemplary and it is to be understood that many variations may be made without deviating from the invention as disclosed and described. For example, the climate load demand values can be modified as required. Preferably, the control logic is implemented primarily in software executed by a microprocessor-based controller. Of course, some or all of the control logic may be implemented in software, hardware, or a combination of software and hardware depending upon the particular application. When implemented in software, the control logic is preferably provided in a computer-readable storage medium having stored data representing instructions executed by a computer to control the heating/cooling of the vehicle cabin. The computer-readable storage medium or media may be any of a number of known physical devices which utilize electric, magnetic, and/or optical devices to temporarily or persistently store executable instructions and associated calibration information, operating variables, and the like.

The above-described control logics are only exemplary and it is to be understood that many variations may be made without deviating from the invention as disclosed and described. For example, the climate load demand values can be modified as required.

In addition, the control logic set forth above generally represents control logic for the described embodiments of a system or method according to the disclosed invention. As will be appreciated by one of ordinary skill in the art, the diagrams may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

While the best mode for carrying out the invention has been described in detail, those familiar with the art to which this invention relates will recognize various alternative designs and embodiments for practicing the invention as defined by the following claims.

What is claimed is:

1. A system for determining the on and off time of a vehicle having an internal combustion engine to obtain and maintain desired level cabin thermal comfort and optimum fuel economy, the system comprising:
    a temperature controller operatively associated with the engine, said controller having logic for determining and for responding to climate load demand and for identifying optimum cabin thermal comfort based on the slope of cabin temperature/time;
    a cabin temperature sensor;
    an outside ambient temperature sensor;
    an evaporator temperature sensor;
    a cabin humidity sensor;
    a temperature control door position sensor; and
    an engine coolant temperature sensor, said sensors being operatively associated with said controller.

2. The system for determining the on and off time of a vehicle of claim 1 wherein said outside ambient temperature sensor is a Tambient sensor.

3. The system for determining the on and off time of a vehicle of claim 1 wherein said evaporator temperature sensor is a Tcabin sensor.

4. The system for determining the on and off time of a vehicle of claim 1 wherein said cabin humidity sensor is a thermistor temperature sensor.

5. The system for determining the on and off time of a vehicle of claim 1 wherein said temperature control door position sensor is a Tset point sensor.

6. The system for determining the on and off time of a vehicle of claim 1 wherein said temperature controller is part of an electronic automatic temperature control system.

7. The system for determining the on and off time of a vehicle of claim 6 further including a sunload sensor also used by said temperature controller to calculate climate load.

8. The system for determining the on and off time of a vehicle of claim 1 wherein said temperature controller is part of a manual temperature control system.

9. The system for determining the on and off time of a vehicle of claim 8 wherein said evaporator temperature sensor is a Tcabin sensor.

10. The system for determining the on and off time of a vehicle of claim 1 further including a conditioner for defrosting or defogging vehicle glass operatively associated with said temperature controller.

11. The system for determining the on and off time of a vehicle of claim 1 further including one or more additional inputs operatively associated with said temperature controller, said inputs being selected from the group consisting of a windshield wiper, a heated windshield, a heated back light, an HVAC blower, and a temperature control setting.

12. A system for determining the on and off time of a vehicle having an internal combustion engine to obtain and maintain desired level cabin thermal comfort and optimum fuel economy, the system comprising:
    a temperature controller operatively associated with the engine, said controller having logic for determining and for responding to climate load demand and for identifying optimum cabin thermal comfort based on the slope of cabin temperature/time;
    one or more temperature sensors operatively associated with said controller, said one or more sensors being selected from the group consisting of a cabin temperature sensor, an outside ambient temperature sensor, an evaporator temperature sensor, a cabin humidity sensor, a temperature control door position sensor, and an engine coolant temperature sensor; and
    one or more vehicle accessories operatively associated with said controller, said one or more vehicle accessories being selected from the group consisting of a windshield wiper, a heated windshield, a heated back light, an HVAC blower, and a temperature control setting.

13. The system for determining the on and off time of a vehicle of claim 12 wherein said temperature control door position sensor is a Tset point sensor and wherein said cabin humidity sensor is a thermistor temperature sensor.

14. The system for determining the on and off time of a vehicle of claim 12 wherein said temperature controller is part of an electronic automatic temperature control system.

15. The system for determining the on and off time of a vehicle of claim 14 further including a sunload sensor also used by said temperature controller to calculate climate load.

16. The system for determining the on and off time of a vehicle of claim 12 wherein said temperature controller is part of a manual temperature control system.

17. The system for determining the on and off time of a vehicle of claim 12 further including a conditioner for defrosting or defogging vehicle glass operatively associated with said temperature controller.

18. A method for determining the on and off time of a vehicle having an internal combustion engine to obtain and maintain desired level cabin thermal comfort and optimum fuel economy, the method comprising:
    forming a start-stop strategy system comprising a temperature controller operatively associated with the engine, said controller having logic for determining and for responding to climate load demand, said system further comprising one or more temperature sensors operatively associated with said controller, said one or more sensors being selected from the group consisting of a cabin temperature sensor, an outside ambient temperature sensor, an evaporator temperature sensor, a cabin humidity sensor, a temperature control door position sensor, and an engine coolant temperature sensor, said system further comprising one or more vehicle accessories operatively associated with said controller, said one or more vehicle accessories being selected from the group consisting of a windshield wiper, a heated windshield, a heated back light, an HVAC blower, and a temperature control setting;

calculating optimum cabin thermal comfort level based upon the slope of cabin temperature/time whereby a flat slope indicates that said optimum thermal comfort has reached a steady state condition;

operating the engine until said calculated optimum cabin thermal comfort level is achieved; and turning on or turning off the engine to maintain said optimum cabin thermal comfort level while maintaining optimum fuel economy.

19. The method for determining the on an off time of a vehicle of claim 18 wherein said optimum cabin thermal comfort is based upon cabin temperature at the given cabin thermal load whereby the cabin thermal load is determined from an established look-up table.

* * * * *